US008553982B2

(12) United States Patent
Tong et al.

(10) Patent No.: US 8,553,982 B2
(45) Date of Patent: Oct. 8, 2013

(54) MODEL-BASED PLAY FIELD REGISTRATION

(75) Inventors: Xiaofeng Tong, Beijung (CN); Wenlong Li, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 712 days.

(21) Appl. No.: 12/646,807

(22) Filed: Dec. 23, 2009

(65) Prior Publication Data

US 2011/0150275 A1 Jun. 23, 2011

(51) Int. Cl.
*G06K 9/46* (2006.01)
*G06K 9/00* (2006.01)
*G06K 9/34* (2006.01)
*G06K 9/50* (2006.01)
*G06K 9/52* (2006.01)
*H04N 7/18* (2006.01)
*H04N 5/225* (2006.01)

(52) U.S. Cl.
USPC ........... 382/190; 382/107; 382/173; 382/201; 382/206; 348/157; 348/169

(58) Field of Classification Search
USPC ........... 382/107, 173, 190, 201; 348/157, 169
See application file for complete search history.

(56) References Cited

U.S. PATENT DOCUMENTS

2004/0223052 A1 11/2004 Sugano
2007/0098222 A1 5/2007 Porter et al.

FOREIGN PATENT DOCUMENTS

| JP | 2004128550 | 4/2004 |
| JP | 2006-309529 | 11/2006 |
| JP | 2009-251940 | 10/2009 |
| WO | WO-2008/118147 | 10/2008 |

OTHER PUBLICATIONS

Notification of Reasons for Refusal for Japanese Patent Application No. 2010-277067, (Dec. 28, 2011), 3 pages.
"European Search Report, EP 10 25 2179", Mailing Date Feb. 3, 2012, 3 pages.
"OpenCV Programming Book Production Team of Nara Institute of Science and Technology", *OpenCV Programming Book, 2nd ed. Mainichi Communications Corp.*, (Jul. 21, 2009), pp. 446-447.
Farin, Dirk , et al., "Fast Camera Calibration for the Analysis of Sport Sequences", *IEEE International Conference on Multimedia and EXPO*, 2005. XP-010844355, (Jul. 6, 2005), 4 pages.
Farin, Dirk , et al., "Robust Camera Collaboration for Sport Videos using Court Models", *Dept of Computer Science IV, University of Mannheim, Germany*, Proceedings of SPIE, vol. 5307, XP002365795, (Jan. 1, 2004), pp. 80-91.
Hayet, Jean-Bernard , et al., "Robust incremental rectification of sport video scenes", *British Machine Vision Conference* Sep. 7-9, 2004., pp. 1-10.

(Continued)

*Primary Examiner* — Anand Bhatnagar
*Assistant Examiner* — Soo Park
(74) *Attorney, Agent, or Firm* — Blakely, Sokoloff, Taylor & Zafman LLP

(57) ABSTRACT

A method, apparatus, and system are described for model-based playfield registration. An input video image is processed. The processing of the video image includes extracting key points relating to the video image. Further, whether enough key points relating to the video image were extracted is determined, and a direct estimation of the video image is performed if enough key points have been extracted and then, a homograph matrix of a final video image based on the direct estimation is generated.

16 Claims, 14 Drawing Sheets

(56) References Cited

OTHER PUBLICATIONS

Misu, Toshie, et al., "Camera Parameter Estimation Using Control Points with Adjacent SIFT Features", *Proceedings of 8th Information and Communication Engineers and Information Processing Society of Japan) Promotion Committee*, vol. 3, (pp. 207-212), Aug. 20, 2009.

Wenglong, Li, "Optomization and Parallelization on a Multimedia Application", *Multimedia and Expo, 2007 IEEE*. XP031124010, (Jul. 1, 2007), pp. 1854-1857.

Yang, Liu, et al., "A new method to calculate the camera focusing area and player position on playfield in soccer video", *Visual Communications and Image Processing. Proc. of SPIE* vol. 5960, (Jul. 12, 2005), pp. 1524-1533.

Japanese Patent Application No. 2010-277067, Notice of Reasons for Refusal, Issued Sep. 26, 2012 (Mailed Oct. 2, 2012), 7 pages.

Korean Patent Application No. 10-2010-132829, Notice of Preliminary Rejection (Non-Final), Issued May 16, 2012 (Mailed Jun. 7, 2012), 4 pages.

"Chinese Patent Application No. 201010625051.5", First Office Action, mailed Dec. 31, 2012, 9 pages.

Sun, Wei, et al., "A Multiple-Object Tracking Method for a Pseudo Particle Filter", Journal of Xidian University, Apr. 2008, vol. 35, No. 2. 6 pages.

Zhang, Miaohui, et al., "Maneuvering Target Algorithms Based on Interactive Multiple Models", (Abstract) Jul. 2007 Information Technology, 4 pages.

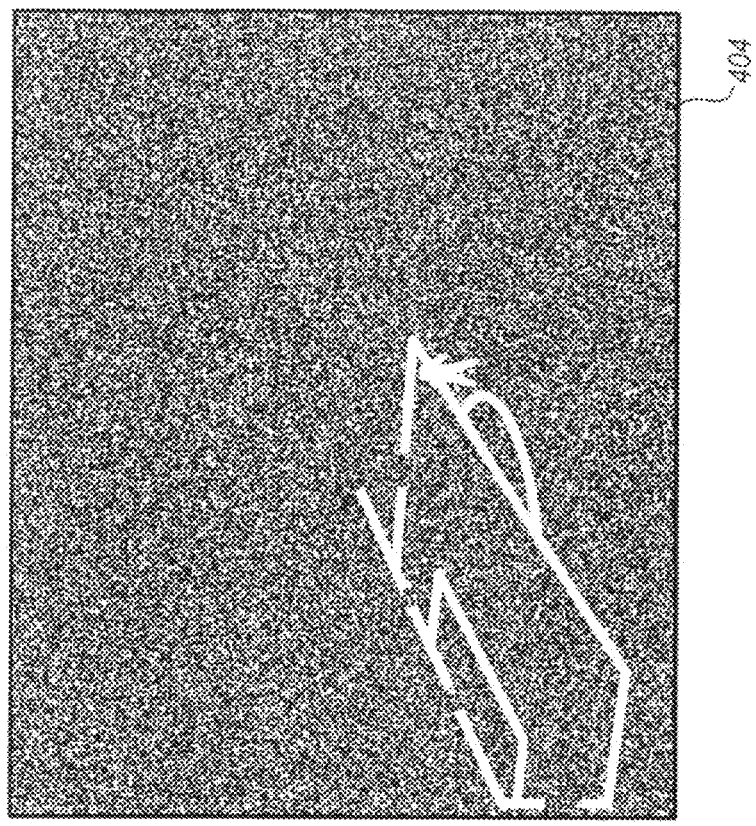
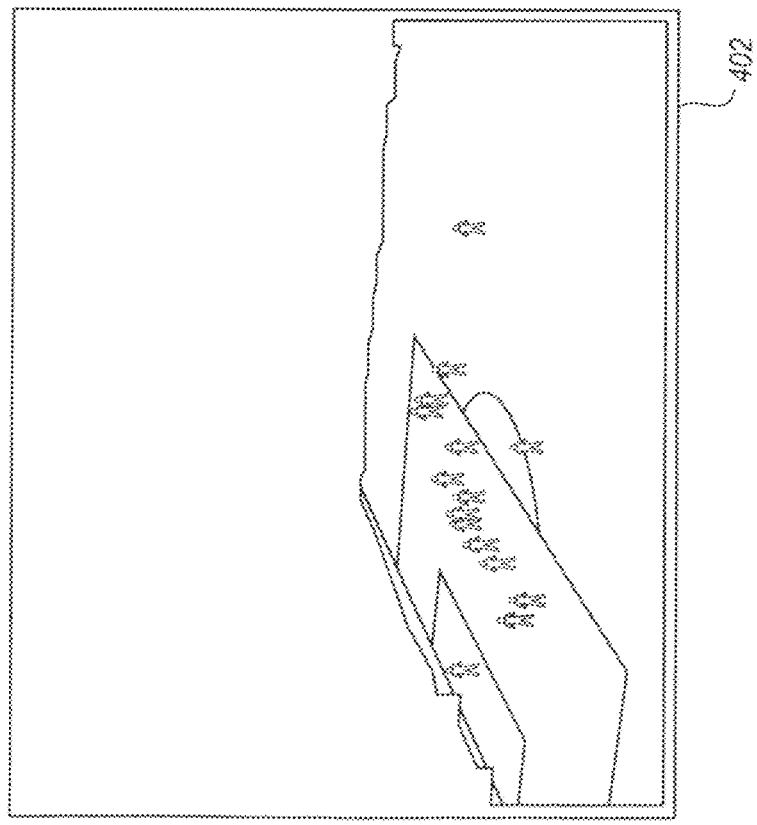
FIG. 4

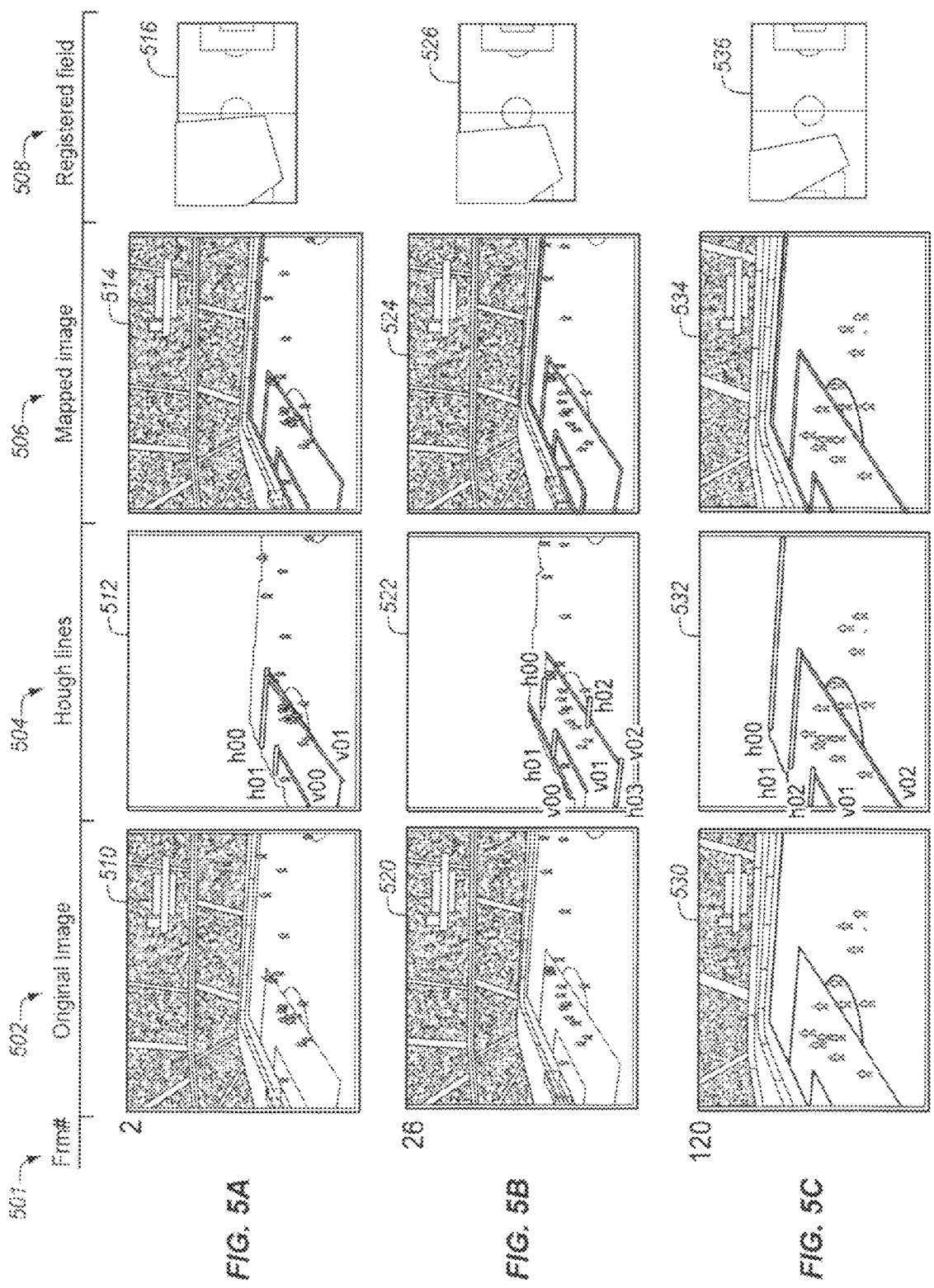

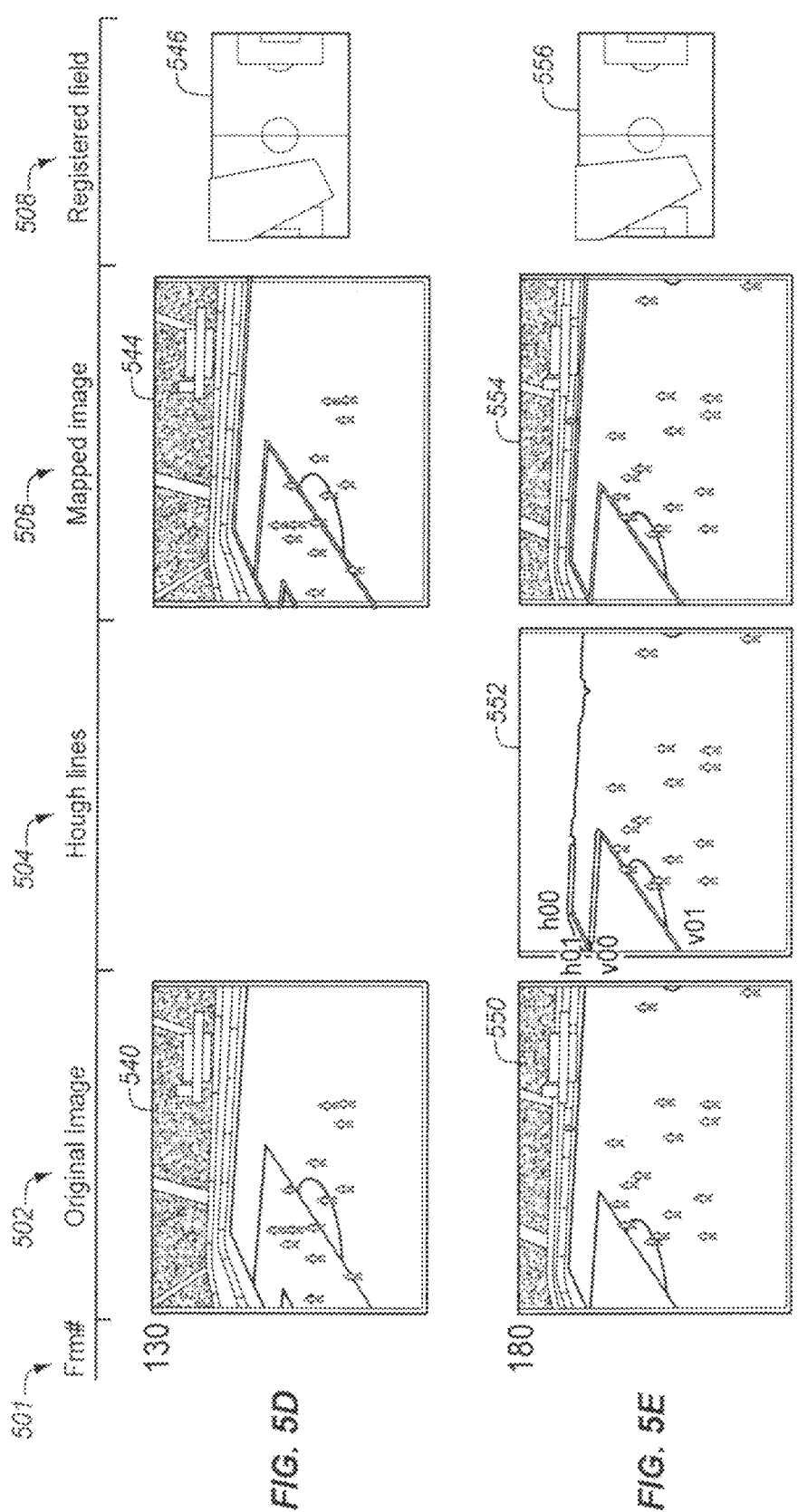

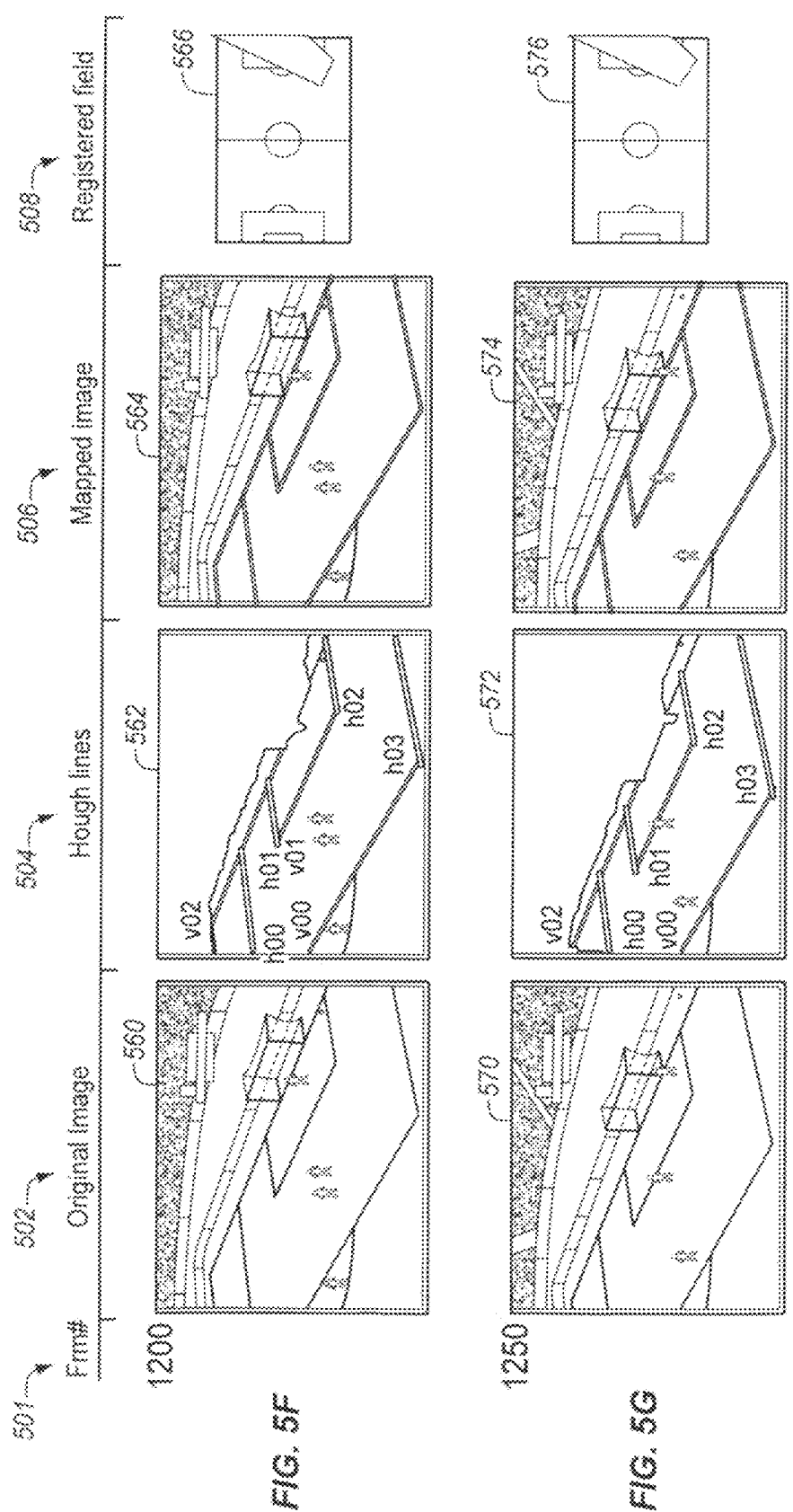

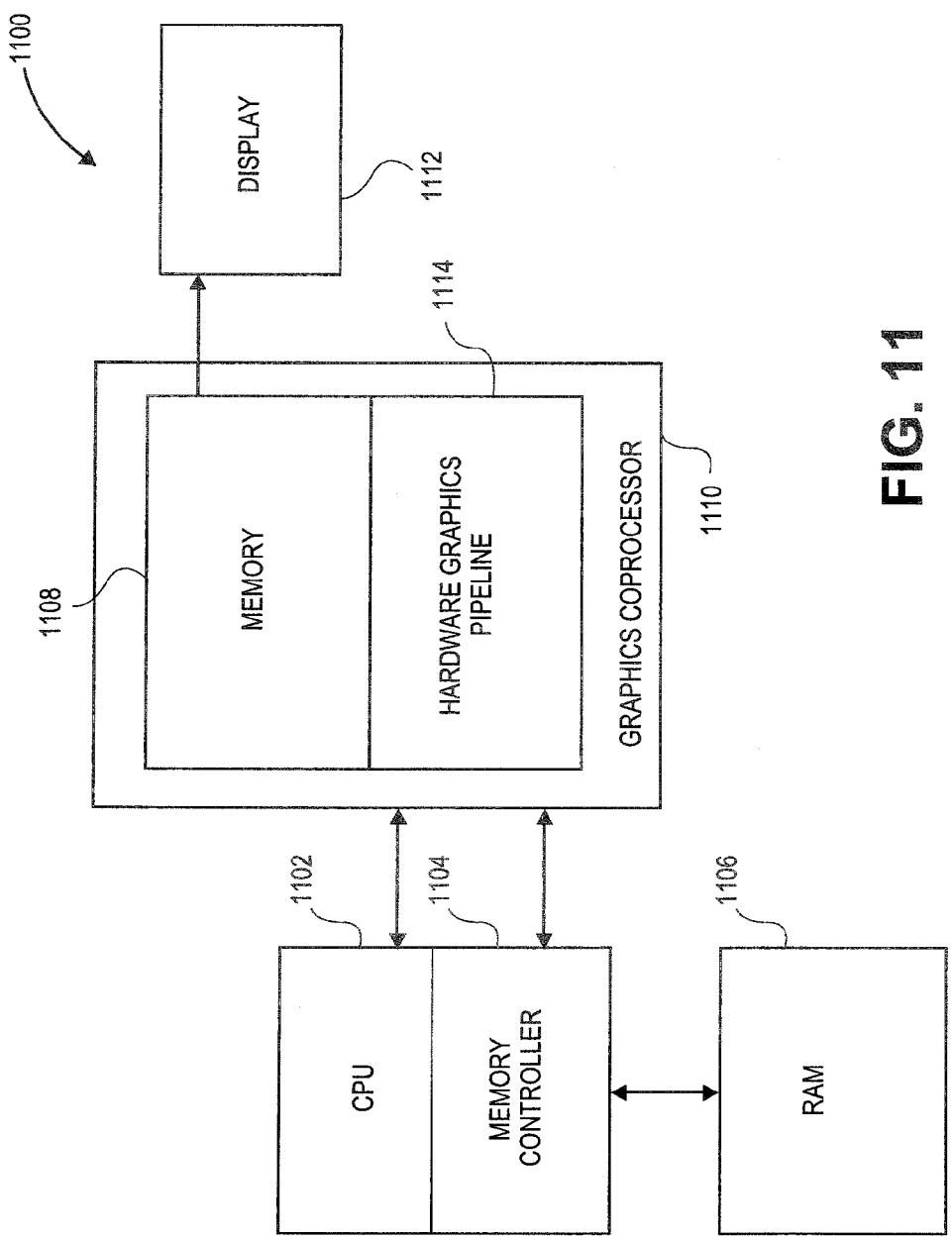

MODEL-BASED PLAY FIELD REGISTRATION

FIELD

The field relates generally to the computing sciences and, more particularly, to video imaging.

BACKGROUND

Image registration problem is common with video sequences. Typically, image registration is used in image processing to match two or more video sequences at different times from different sensors or from different viewpoints. However, despite some advancement in this area of image registration, distortions in images remain. These distortions include misregistration (e.g., misalignment of images). Other than not being able to remove these frequent distortions, these conventional image registration algorithms consume a great deal of search space while achieving only a little. Further, searches performed with conventional image registration algorithms are not stable.

BRIEF DESCRIPTION OF THE DRAWINGS

Embodiments of the present invention are illustrated by way of example and not by way of limitation in the figures of the accompanying drawings, in which like references indicate similar elements and in which:

FIGS. 5A-5G illustrate an embodiment of model-based play field registration in sports video;

FIG. 11 illustrates an embodiment of a computing system having embodiments of the present invention implemented as a hybrid of software and hardware components.

DETAILED DESCRIPTION

In one embodiment, a field registration technique is disclosed for finding a geometric correspondence between a screen image and a field model and then mapping the playfield from a screen image to the standard field model. Sports, in general, and soccer, in particular, are used throughout this document merely as examples and for brevity and clarity. It is contemplated that the embodiments disclosed in this document can applied to any video images regardless of their content. Continuing with the sports example, a key component in sports video is mapping the ball and the players' moving trajectories to a field model. In performing such mapping, each player's relative positions in the field coordinate system can be obtained from the registered field. These relative positions include a player's moving direction, approximate speed, and activity. Such cues can help facilitate team-based line-up and tactics analysis, activity based scene retrieval, video content enrichment and edition, interactive and immersive gaming, augmented reality, etc., in the domains of visual computing and computer graphing.

In one embodiment, a novel field registration algorithm based on relevant field registration hardware components is provided to provide an effective and practical field registration of video images. This novel approach first conducts view-type classification, and then applies the Hough Transform to detect field line-marks and their corresponding intersection points. These intersection points are taken as key points for field registration. When there are enough key points (e.g., more than or equal to 4 key points), a direct matching to search the optimal mapping is carried out. For efficient searching, a distance map generated by a distance transform is used to calculate the matching error. Furthermore, to accelerate searching, several fast rejection criteria are explored and used to speed up the process. In case when the number of key points is not enough (e.g., less than 4 key points), the homography matrix may not be obtained directly; but instead, it is obtained indirectly by estimating global motion between successive frames and combining the current motion transition with any previous field-model mapping matrix to infer current homography mapping matrix. This technique and its effectiveness and practicability are further described in the preceding paragraphs.

This novel and practical field registration technique works with any types and number of video images cases with and without enough key points. This advance and reasonable solution simplifies the difficulty of performing the task of field registration. The field registration technique employs distance transform to measure a matching error, which enables the error to be continuous and makes the search more stable; further, it invents several fast rejection criteria to reduce the search space and speedup the process.

Figure 1:
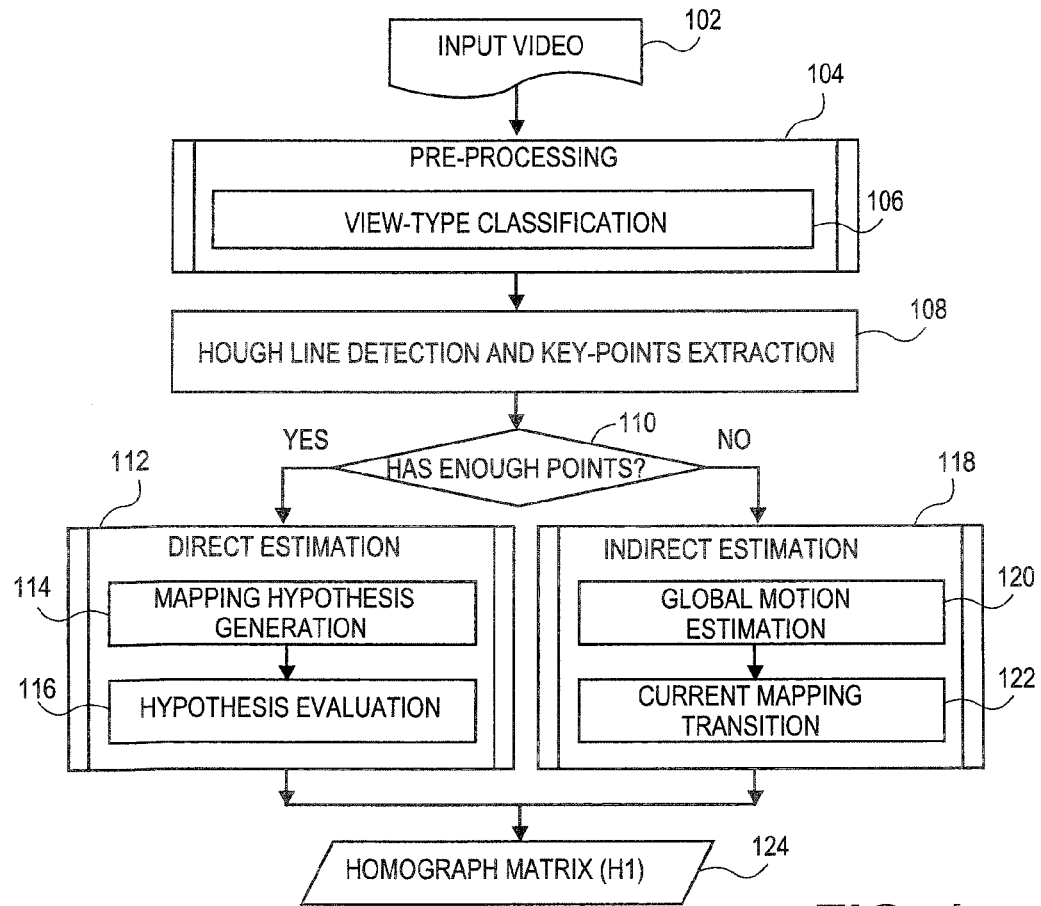
FIG. 1 illustrates a process for performing field registration.

FIG. 1 illustrates a process for performing field registration. At processing block 102, a video input is received thorough a physical interface that is connected to a video device, such as a camera having a computing system including a processor. At processing block 104, pre-processing of the received video is performed. The pre-processing includes performing dominant color learning and view-type classification at processing block 106. The dominant color in video is performed by accumulating the Hue-Saturation-Value (HSV) color histograms, which corresponds to the grass color of a playfield. As aforementioned, it is to be noted again that sports (and particularly soccer) is merely used as an example for brevity and clarity and that the embodiment of the present invention are not limited to sports videos. For example, instead of the grass color of a playfield (as used here), the color could be of the floor of the US Congress during a political debate or the grass during a rally or a living room during a soap opera or movie. The dominant color segmentation and morphological filtering is then used along with the connect-component analysis to extract the playfield. After that, each view is classified into one of four view types: (1) global view; (2) medium view; (3) close-up view; and (4) out of view, while the global view may be fed into the field registration module for further calculations.

Figure 4:
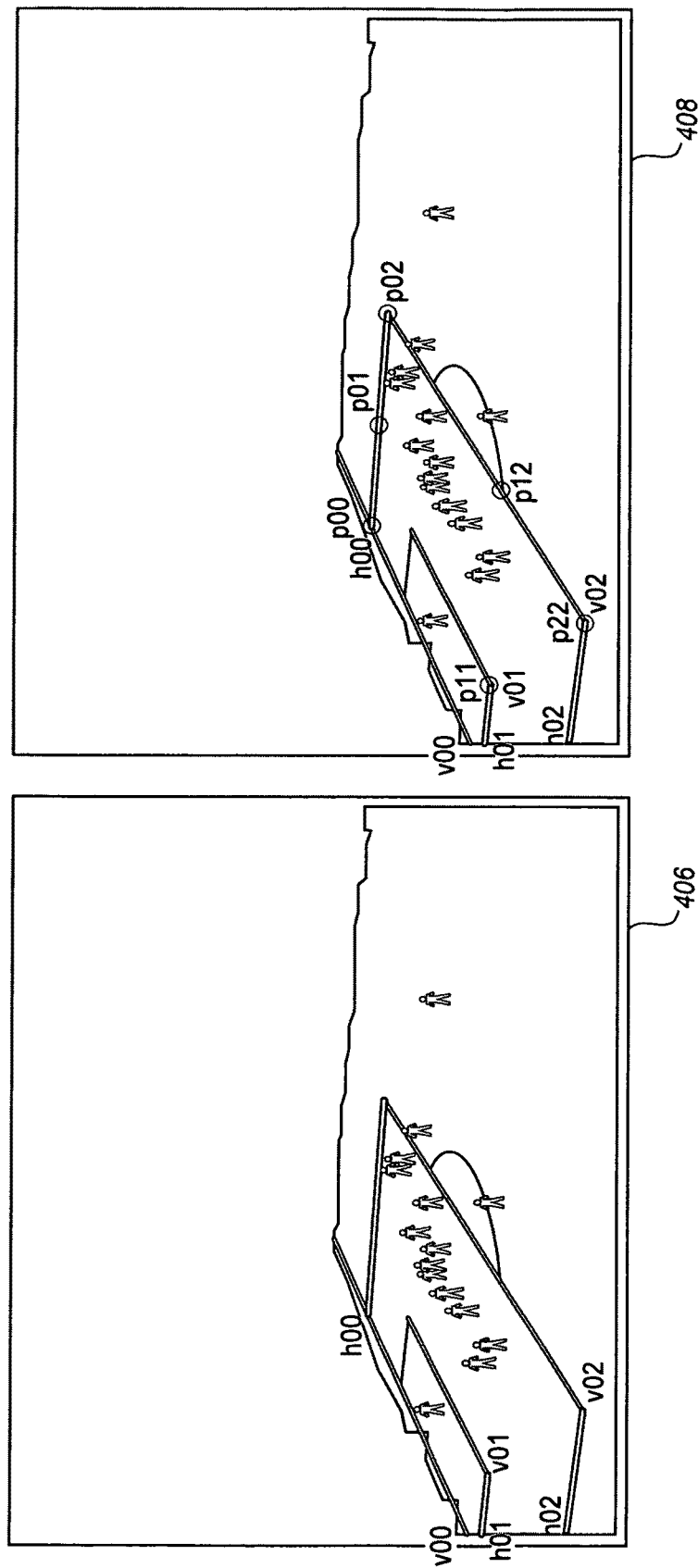
FIG. 4 illustrates an embodiment of a Hough line detection and intersection points extraction.

At processing block 108, Hough line detection and intersection key points extraction is performed. Hough transform is performed to detect line-marks by extracting a playfield region and then, reserving any pixels not consistent with the dominant color within the playfield region and making it to be a bi-level (binary) image. Thereafter, Hough transform is applied to the binary image to detect horizontal and vertical line-marks and then its intersection key points are obtained. Further, both the real and virtual intersection points are detected and used. This is illustrated in FIG. 4.

At decision block 110, a determination is made as to whether there are enough key points. If there are enough points, a novel direct mapping estimation is performed at processing block 112. This novel direct mapping estimation is performed through a matching hypothesis generation at processing block 114, followed by hypothesis evaluation and optimal correspondence search at processing block 116. If there are not enough points, an indirect mapping estimation is performed at processing block 118. The indirect mapping estimation includes key-points detection, filtering and global motion estimation at processing block 120, followed by conducting a current mapping transaction at processing block 122. In either case (i.e., direct or indirection mapping estimation), the process continues with generating a homograph matrix (Ht) 124.

As aforementioned, when there are enough points (such as more than four corresponding points; subsequently, an intersection of at least two horizontal lines and at least two vertical lines) between the screen image and the field model, the direct estimation is performed, a processing block 112, to estimate the homograph matrix. This direct estimation includes determining which pair of points correspond to each other and the field model and these possible cases are enumerated and a search of the optimal one through error evaluation is performed. In one embodiment, field model refers to any background or field of the video image for which these embodiments are being performed. However, continuing with the soccer theme, the standard sports soccer field, as defined by Federation Internationale de Football Association (FIFA), is used in this embodiment as the field model. In one embodiment, both the real intersection points (such as an intersection of two real lines, such as horizontal and vertical lines) as well as any virtual intersection points (such as an intersection of one real line and one extended real line, or an intersection of two extended real lines) are used in the field model. These virtual intersection points are also key points of the field model and can be used to calibrate the video device (e.g., camera).

Further, with regard to mapping hypothesis generation, to simplify the mapping procedure, line-marks are used to guide each intersection key point correspondence. $L_h$ refers to the number of horizontal lines and $L_v$ refers to the number of vertical lines (e.g., $L_h$=10 horizontal lines, and $L_v$=7 vertical lines) in the field model. Given that there are m horizontal lines ($L_h$=m) and n vertical lines ($L_v$=n), there are $$\sum_{j=2}^{m} \sum_{k=1}^{n} C(m, j) \cdot C(n, k)(C(n, k)$$

is a combination operation, $$C(n, k) = \frac{n!}{k!(n-k)!}$$

possible combinations of, for example, 4-pair of point correspondence and possible combinations of 4-pair of point correspondence. Each combination may be referred to as a hypothesis, reflecting a possible correspondence between the detected image lines and the field model line-marks.

For each hypothesis evaluation, a mapping matrix H is obtained from the world coordinate to image plane. To evaluate the confidence of each hypothesis, the field model is mapped to image plane and the distance between the mapped image and the original image is calculated. Based on the detected lines, the distance transform technique is used to get distance map to measure any error. If a distance map equals "D", the error is:

$$\varepsilon = \frac{1}{N} \sum_{i=0}^{N-1} \min(D(i), \tau).$$

Where N is the total number of non-zero pixels, and $\tau$ is a constant to restrict the maximum error. The error and the mapping may be inversely proportional to each other, e.g., the smaller the error, the better the mapping. The optimal hypothesis is used as the final matching.

As the search space is huge, the hypothesis evaluation can be demanding in terms of computation power requirements. In one embodiment, to reduce the search space, one or more of the following criteria are used to fast reject some hypothesis: (1) based on the angles of detected lines (particularly, the vertical lines), a field side (e.g., left, right or middle side) may be estimated. For example, if the play-position is in a left-field side, the lines to be matched in the field model are not to be at the right. Similarly, the right side is processed vice versa. Several hypotheses are filtered using this criterion; (2) if two or more horizontal lines or two or more vertical lines have been matched between the field model and a given image, the size of the field model is estimated. Further, if the estimated size is much different from the standard field model, this hypothesis may be rejected and another hypothesis with a different criterion may be used; and (3) another fast rejection is to evaluate the homography matrix itself. The homography matrix has several (e.g., eight) degrees of freedom, but the real-image formation process may have a different number of parameters (e.g., seven), such as three for a camera position, three for a camera rotation, and one for a focal-length. The remaining degree includes β (non-isotropic scaling), which refers to unequal scaling in horizontal and vertical directions (that is typically, "1" in the real world). This value may be obtained based on a camera calibration theory. Further, for those estimated camera parameters that are not perfectly accurate and whose calculation is numerically sensitive, a parameter accept range of 0.5<β<2 is set.

As aforementioned, when there are no enough key points (e.g., less than 4) in the current frame, an indirect mapping estimation is performed, at processing block 118, by performing a camera motion translation from a previous to the current frame to deduce the current homography mapping matrix at processing block 124. In one embodiment, this indirect mapping estimation procedure includes one or more of feature point detection, point matching between two successive images, point pair filtering via random sample consensus (RANSAC), and global motion calculation with the least square estimation. The first process includes detecting key points, in which corner points, Harris points, Speed Up Robust Features (SURF), etc., are can be used. Further, the Scale Invariant Feature Transform (SIFT) feature may be used to characterize the key points.

After detecting the key points in the previous and current frames, respectively, a correspondence is set between the previous and current frames. For each point in the previous frame, a distance from each point of the previous frame to each point in the current frame is calculated, and the nearest points or the shortest distance is taken as its correspondence. A set of key point correspondence may also include some data outliner, such as noise or false matches. In that case, apply the RANSAC algorithm is applied to filter out such outliers. The RANSAC algorithm refers to an algorithm for robust fitting of field models in the presence of and while dealing with any number of data outliers. Then, global motion parameters are computed under a perspective model with the reserved consistent point correspondence using a least square estimation. For example, if the homography mapping matrix at time t is $H_t$, and the motion transition matrix from time t−1 to t being $M_{t-1}$. Once these values are known, the homography mapping matrix can be obtained using the following formula: $H_t = M_{t-1}*H_{t-1}$.

Figure 2:
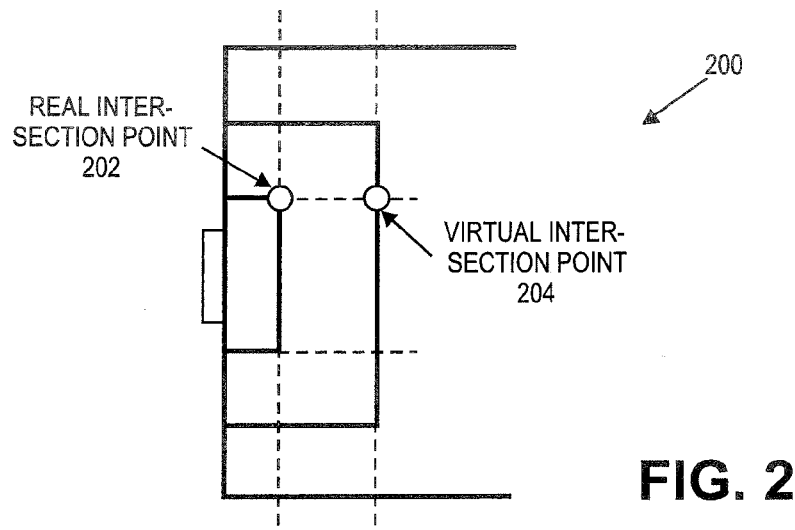
FIG. 2 illustrating an embodiment of a homograph matrix of a field model having a real point and a virtual point.

FIG. 2 illustrating an embodiment of a homograph matrix 200 of a field model having a real point 202 and a virtual point 204. In one embodiment, a 3-D point with homogenous coordinates is denoted as P=[X,Y,Z,1]', and the Z component of a 3D point on the plane is zero, so it is denoted as P=[X,Y,1]'. A 2-D point on a retina is p=[x,y,1]'. For a pin-hole camera, a 3-D point P in real world coordinate system and its corresponding 2-D image point p have following relationship: p=H*P, where H is a 3×3 matrix parameterized in term of intrinsic and extrinsic parameters. It is called homograph matrix between a plane in the real world and a screen image.

Further, the matrix H is defined up to a scale factor having several (e.g., eight) independent parameters. To determine the values of, for example, eight parameters, at least four pairs of point correspondence between image positions and a field model positions are used. Since the field usually does not have obvious point-features, the intersections of lines within the playfield to estimate the point-correspondence are used. Any real inter-section points 202 and virtual inter-section points 204 being intersected by real lines and extension of real lines (e.g., virtual lines) are regarded as key-points and they both can be used to calibrate the camera.

Figure 3:
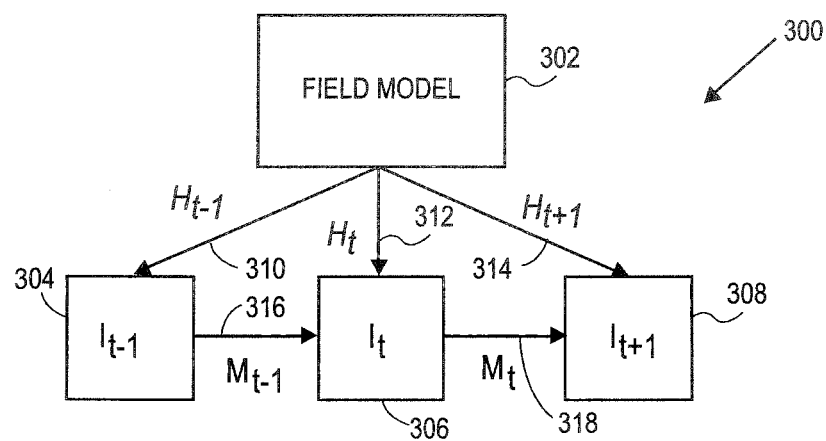
FIG. 3 illustrating an embodiment of a homographic mapping between a field model and screen images and further, a motion transition between the screen images.

FIG. 3 illustrating an embodiment of a homographic mapping 310-314 between a field model 302 and screen images 304-308 and further, a motion transition 316-318 between the screen images 304-308. Continuing with the soccer example, if a camera focuses on the near goalmouth area, it would be easy to find more than four pairs of corresponding points. However, for the near mid-field area or the image being blurred or unclear (e.g., due to the fast camera motion), it might be a bit difficult to detect lines as there might not be enough corresponding key points available. To address this problem, in one embodiment, a global motion transition and the homography matrix of the previous frame are used to approximately infer the current homography matrix 310-314. The homography matrix 310-314 (as indicated by the arrows 310-314) between the field model 302 and the screen images 304-308 as well as the motion transition 316-318 (as indicated by the arrows 316-318) between the successive screen images 304-308 are illustrated here.

Assuming the global motion model to be a perspective model whose transform is also 3×3 matrix, the estimation of the current frame from its previous frame $I_{t-1}$ and the global motion transform $M_{t-1}$ (FIGS. 5A-5G) can be formatted using the following formula: $I_t=H_t*F$ (formula 1). Denoting field model to be F, the mapping from the field model to image is: $I_{t-1}=H_{t-1}*F$ (formula 2) and $I_t=M_{t-1}*I_{t-1}$ (formula 3). Substituting formula 2 into formula 1, the following is obtained: $I_t=M_{t-1}*H_{t-1}*F$ (formula 4). Now, comparing formula 1 with formula 4, results in the following formula: $H_t=M_{t-1}*H_{t-1}=M_{t-1}*M_{t-2}*H_{t-2}=\ldots=M_{t-1}\ldots M_{t-k}*H_{t-k}$.

FIG. 4 illustrates an embodiment of a Hough line detection and intersection points extraction 400. In one embodiment, Hough transform is used to detect line-marks. Firstly, a playfield region is extracted 402 and then, pixels not consistent with the dominant color are reserved within the playfield 402 and are made to be bi-level image 404. Then, Hough transform on the binary image to detect any horizontal and vertical line-marks 406. Finally, we the intersection points of the horizontal and vertical lines are obtained and both the real and virtual intersection points are detected and used 408.

FIGS. 5A-5G illustrate an embodiment of model-based play field registration in sports video 500. Columns include frame numbers 501, original screen images 502, Hough line detection results 504 (having vertical and horizontal lines), results of mapping filed model to real images 506, and field registered results 508. Results of performing field registration on a video clip of MPEG2 format (e.g., 720×576 frame size and 25 frame/second) are provided.

The gray region is the camera focus area. In the listed frames, FIGS. 5A-5B, frame 2-26, are the left field of the field model, FIGS. 5C-5E, frames 120-180, are the left-middle field of the field model, and FIGS. 5F-5G, frames 1200-1250, are the right field of the field model. The results of frames 2, 26, 120, 180, 1200 and 1250 are received by direct estimation, while the result of frame 130 is obtained by indirect estimation. Further, as shown, the Hough line image is missing form frame 130, because not enough number of key points were obtained due to the image 540 being polluted or out of focus.

Figure 6:
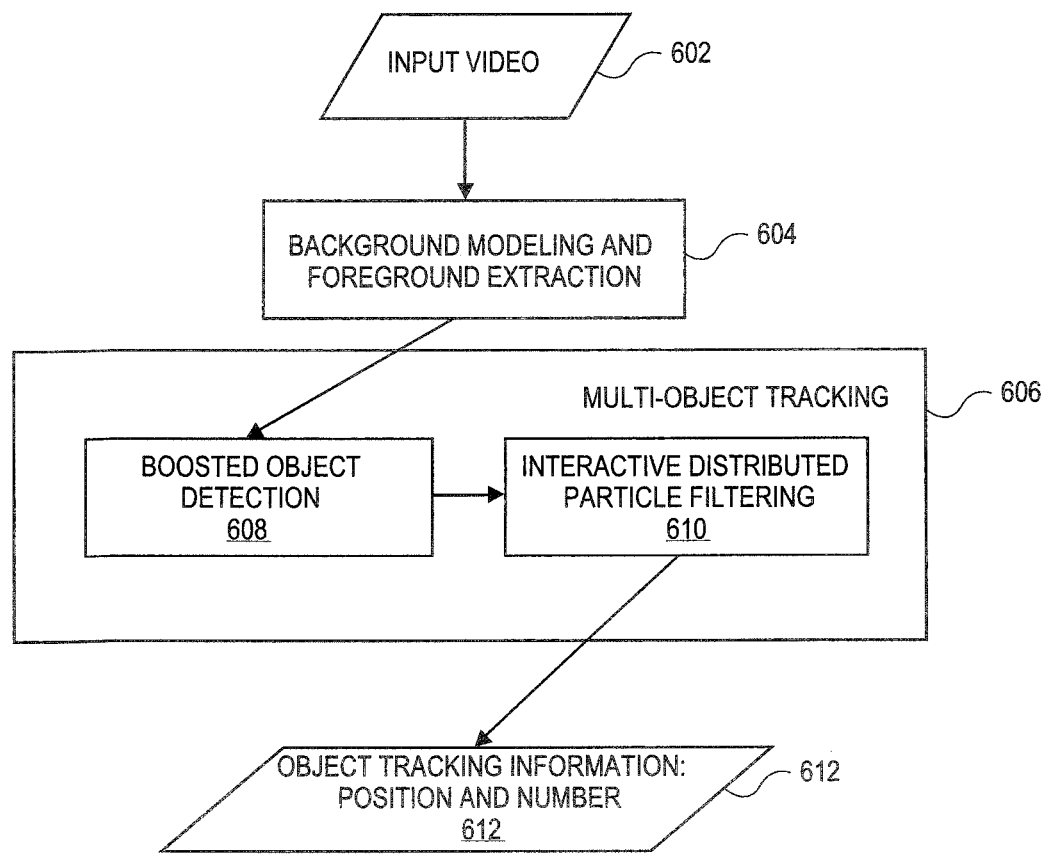
FIG. 6 illustrates an embodiment of a process for multi-object tracking based on boosted interactively distributed particle filter.

FIG. 6 illustrates an embodiment of a process for multi-object tracking based on boosted interactively distributed particle filter. Input video is received at processing block 602. The input video may be received through a video/bus interface from one video device to another video device, each device having a software application, or within the same video device (e.g., camera having a processor/CPU). At processing block 604, a background modeling and foreground extraction of the input video is performed. In one embodiment, boosted object detection 608 and interactive distributed particle filter 610 are integrated to perform robust and effective multi-object tracking at processing block 606. To accomplish this, a boosted interactively distributed particle filter (BIDPF) software and hardware are provided to address the problem of automatic multi-object tracking (MOT) in various applications (e.g., sports player tracking applications, such as a soccer player tracking application). At processing block 612, object tracking information (e.g., position and number) of the images are obtained and provided. Again, soccer is merely being used here as an example and for brevity and clarity and it is contemplated that the embodiments of the present inventions can be used with any number of applications and are not limited to sports or sports applications.

In one embodiment, the interactive distributed particle filter technique (IDPF), processing block 610, is adopted to handle mutual occlusions among various targets. The proposed distribution using a mixture model that incorporates information from the dynamic model and the boosting detection is introduced into the IDPF framework. The boosted proposal distribution, at processing block 608, allows for a quick detect targets, while the IDPF process enables keeping the identity of such targets during mutual occlusions. In a sports video, the foreground is extracted, at processing block 604, by using an automatic learned color model of a given playfield to both speed up the boosted detection and reduce false alarms. The foreground is also used to develop a data-driven potential model to improve the IDPF performance. Some of the results of this novel approach being performed on several video sequences have demonstrated tracking of a variable number of objects and correctly maintain their identities in a dynamic scene with camera motion and mutual occlusions (as illustrated in preceding figures).

Figure 7:
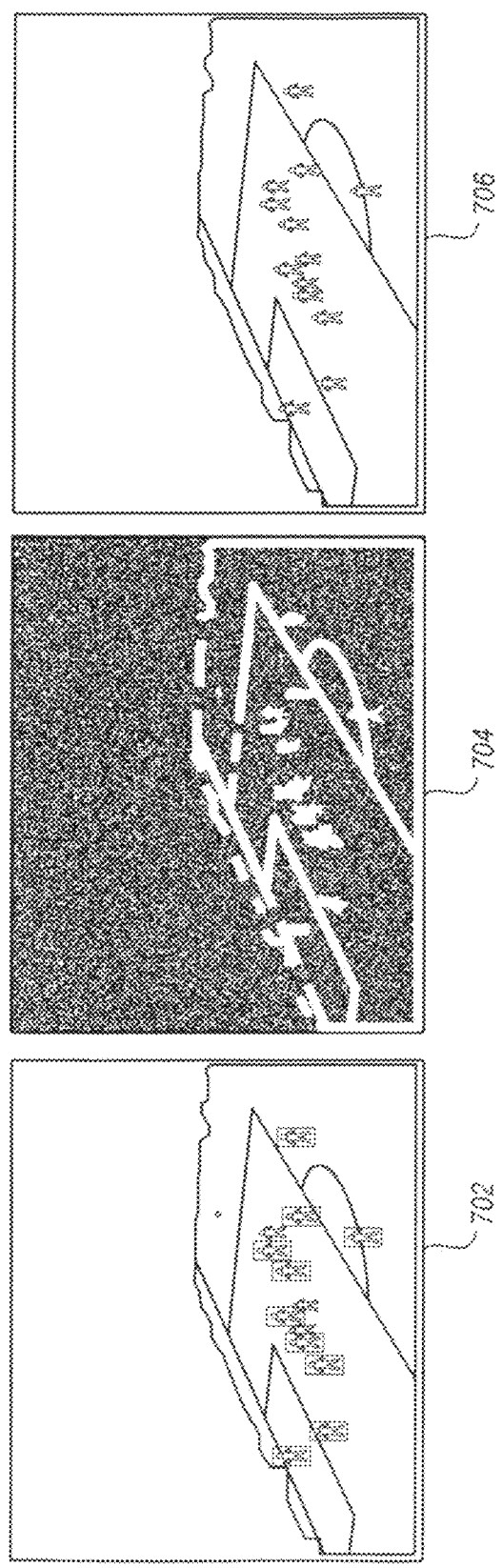
FIG. 7 illustrates an embodiment of a boosted interactive distributed particle filter.

FIG. 7 illustrates an embodiment of a boosted interactive distributed particle filter. A color model of the field is learned by accumulating HSV color histograms. The field is then extracted through dominant color thresholding, morphological filtering, and connect-component analysis 702. The foreground in the field is obtained by filtering the field color using the dominant color model 704. Then, the boosting detector scans across the foreground image at multiple scales 706. This process accelerates the detection and reduces any false alarms. Further, to handle the interaction among the targets, an interactive distributed approach is adopted; in this approach, the conditional density propagation for each object is formulated by modeling the interaction among the objects' observations in a distributed scheme. In the particle filtering implementation, any occlusion problems are handled by adjusting the weight of each particle.

In one embodiment, the state of target i in time t and the corresponding observation are denoted as $x_t^i$ and $y_t^i$. The state set up to time t is $x_{0:t}^i$, where $x_0$ is the initial state, and the observation set up to time t is $y_{0:t}^i$. The interactive observations of $y_t^i$ at time t is denoted by $y_t^{J_t}$, where the elements of $J_t$ are the indices of objects whose observations interact with $y_t^i$. The purpose of tracking is to estimate the posterior based on all the observations $p(x_{0:t}^i | y_{1:t}^i, y_{1:t}^{J_{1:t}})$. When $y^i$ has no interaction with other objects, $p(x_{0:t}^i | y_{1:t}^i, y_{1:t}^{J_{1:t-1}}) = p(x_{0:t}^i | y_{1:t}^i)$, this formulation is consistent with the regular particle filter approach. Using the conditional independence properties, the density propagation for each interactive tracker is formulated as follows: $p(x_{0:t}^i | y_{1:t-1}^i, y_{1:t}^{J_{1:t}}) = k_t p(y_t^i | x_t^i) p(x_t^i | x_{0:t-1}^i) p(x_{0:t-1}^i | y_{1:t-1}^i, y_{1:t-1}^{J_{1:t-1}}) p(y_t^{J_t} | x_t^i, y_t^i)$, where $p(y_t^i | x_t^i)$ is the local likelihood, $p(x_t^i | x_{0:t-1}^i)$ is the state transition density, which are similar to the Bayesian tracking approaches. The equation $p(y_t^{J_t} | x_t^i, y_t^i)$ is known as an interactive likelihood, which characterizes the interaction among targets. In the absence of any integration among the targets, this formulation can be degraded to multiple independent Bayesian trackers.

In particle filter implementation, the posterior probability $p(x_{0:t}^i | y_{1:t-1}^i, y_{1:t}^{J_{1:t}})$ is characterized by a set of weighted samples $\{x_{0:t}^{i,n}, \omega_t^{i,n}\}_{n=1}^N$, where $$\sum_{n=0}^{N-1} \omega_t^{i,n} = 1$$

(where N is the number of samples). According to the importance sampling theory, the weights are updated as:

$$\omega_t^{i,n} \propto \frac{p(y_t^i | x_t^{i,n}) p(x_{t-1}^i | x_{t-1}^{i,n}, x_{t-2}^{i,n}) p(y_t^{J_t} | x_t^{i,n}, y_t^i)}{q(x_t^{i,n} | x_{t-1}^i, y_t^i, y_t^{J_t})} \cdot \omega_{t-1}^{i,n}$$

Figure 8:
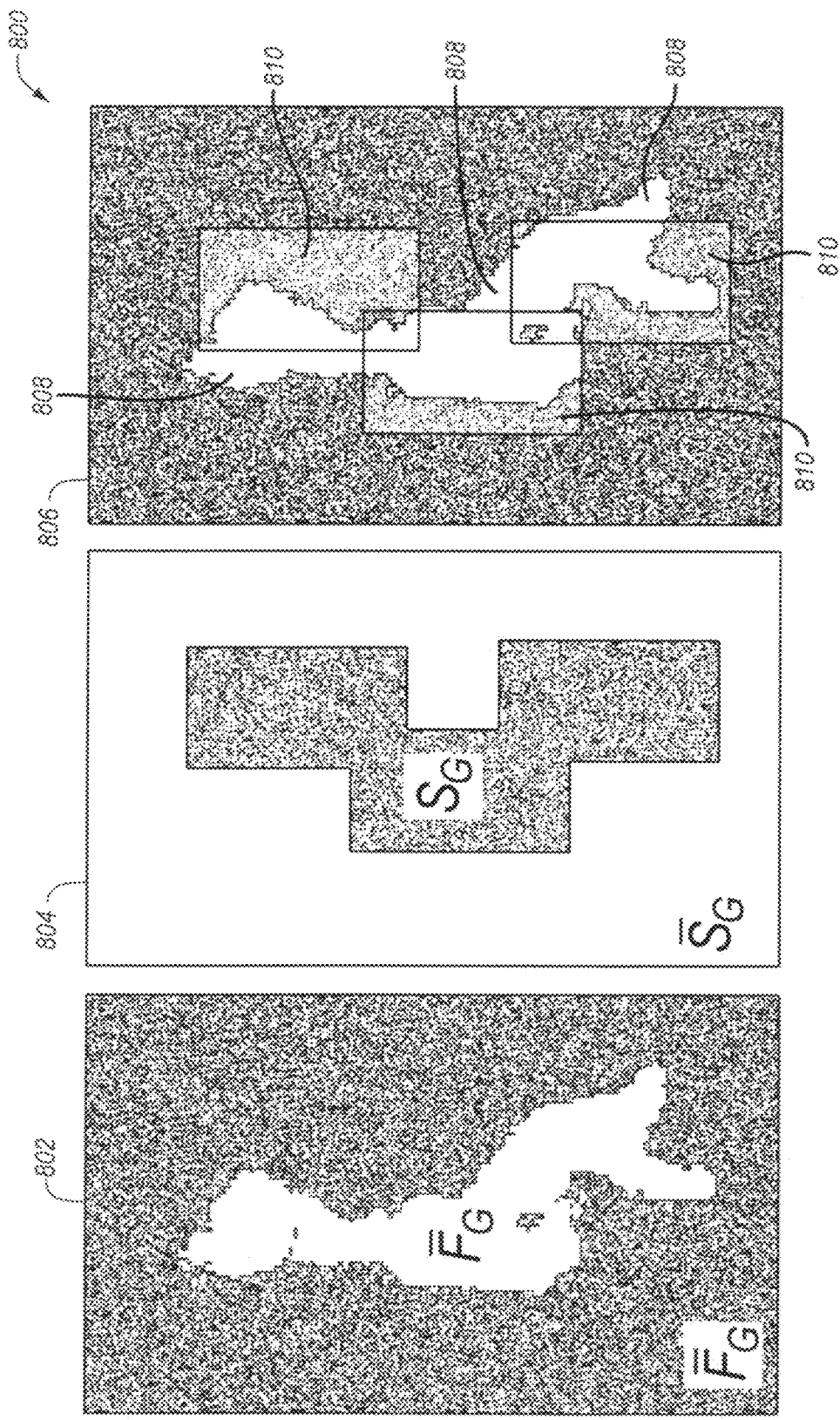
FIG. 8 illustrates objects having interaction with each other forming a group (e.g., group G)

FIG. 8 illustrates objects 802-806 having interaction with each other forming a group (e.g., group G). A data-driven potential model is proposed based on the foreground observation to estimate the interactive likelihood $p(y_t^{J_t} | x_t^i, y_t^i)$ to adjust the weights of particles. Further, G is denoted as the image group formed by the interactive objects, $F_G$ 802 as the image foreground, and $S_G$ 804 as the union of image regions of all the players in G, $p_{11}$ is the probability that a pixel in a player region belongs to the foreground, and $p_{10}$ is the probability that a pixel in a player region does not belong to the foreground, $p_{01}$ is the probability that a pixel outside players is in the foreground, and $p_{00}$ is the probability that a pixel outside players is in the background, wherein $p_{11} + p_{10} = 1$, $p_{11} > p_{10}$, $p_{01} + p_{00} = 1$, and $p_{01} < p_{00}$.

Assuming the pixels are independent, we get the following likelihood:

$$p(y_t^{J_i} | x_t^{i,n}, y_t^i) = \prod_{g \in G} p(g | x_t^{i,n})$$

$$= p_{11}^{\#\Sigma_{g \in F_G \cap S_G}} p_{10}^{\#\Sigma_{g \in F_G \cap \overline{S_G}}} p_{01}^{\#\Sigma_{g \in \overline{F_G} \cap S_G}} p_{00}^{\#\Sigma_{g \in \overline{F_G} \cap \overline{S_G}}}$$

$$= p_{11}^{N_{11}} p_{10}^{N_{10}} p_{01}^{N_{01}} p_{00}^{N_{00}}$$

$$= (1 - p_{01})^{|F_G|} (1 - p_{10})^{|\overline{F_G}|} \left(\frac{p_{10}}{1 - p_{10}}\right)^{N_{10}} \left(\frac{p_{01}}{1 - p_{01}}\right)^{N_{01}}$$

$$= C_G \cdot e^{-(\lambda_{10} N_{10} + \lambda_{01} N_{01})},$$

where $C_G$ is a normalization constant, wherein $\lambda_{10}$ and $\lambda_{01}$ are two coefficients depending on $p_{10}$ and $p_{01}$, respectively, and $\cap$ is the intersection of two regions. The likelihood depends on $N_{10}$ and $N_{01}$. As illustrated in 806, the white pixels outside the rectangles 808 form $N_{10}$ and the black pixels inside the rectangles 810 form $N_{01}$. By exploiting the proposed potential model, the interactive likelihood $p(y_t^{J_i} | x_t^i, y_t^i)$ reduces the probability that objects' estimates do not interpret the observations well; therefore, it can separate the observation in occlusion and thus solve the merging problem.

To solve the labeling problem, in one embodiment, the state transition probability $p(x_t^i | x_{t-1}^i, x_{t-2}^i)$ is estimated by:

$$p(x_t^i | x_{t-1}^i, x_{t-2}^i) = p(x_t^i | x_{t-1}^i) \frac{p(x_{t-2}^i | x_t^i, x_{t-1}^i)}{p(x_{t-2}^i | x_{t-1}^i)}$$

$$= p(x_t^i | x_{t-1}^i) \phi_t^i(x_t^i, x_{t-1}^i, x_{t-2}^i),$$

where $p(x_t^i | x_{t-1}^i)$ is the traditional state transition density and this can be estimated by using a constant acceleration model. Further, the inertia weight $\Phi_t^i(.)$ is defined as:

$$\phi_t^{i,n}(x_t^{i,n}, x_{t-1}^i, x_{t-2}^i) \propto \exp\left(-\frac{(\theta_t^{i,n})^2}{\sigma_\theta^2}\right) \cdot \exp\left(-\frac{(\|v_t^{i,n}\| - \|\hat{v}_t^i\|)^2}{\sigma_v^2}\right),$$

where $\sigma_\theta$, $\sigma_v$ are prior constants which characterize the allowable variances of the motion vector's direction and speed, respectively. $v_t^{i,n} = x_t^{i,n} - x_{t-1}^i$ is the motion vector of the $n^{th}$ particle of the $i^{th}$ object $x_t^{i,n}$; $\hat{v}_t^i = x_{t-1}^i - x_{t-2}^i$ represents the reference motion vector from $x_{t-2}^i$ to $x_{t-1}^i$. $\theta_t^{i,n} = \angle(v_t^{i,n}, \hat{v}_t^i)$ is the angle between $v_t^{i,n}$ and $\hat{v}_t^i$. $\|\cdot\|$ represents the $L_2$ norm.

An issue in keeping particle filtering effective is how to design the proposal distribution. In one embodiment, a mixture of Gaussians model that combines both the dynamics prior and the boosting detections: $q(x_t^i | x_{t-1}^{i,n}, y_t^i, y_t^{J_i}) = \alpha_q \cdot q_{data}(x_t^i | x_{t-1}^{i,n}, y_t^i, y_t^{J_i}) + (1 - \alpha_q) \cdot p(x_t^i | x_{t-1}^{i,n})$. The parameters $\sigma_q$ is dynamically updated by the overlap between the Gaussian distribution of boosting detection and the dynamics prior. The Nearest Neighbor algorithm is used for the data association of assigning boosting detections to the existing tracks.

With regard to the local likelihood $p(y_t^i | x_t^i)$, the observation of the target is represented by a kernel density estimation of the color distribution extracted from the region $R(x_t^i)$ centered at the location $x_t^i$. The Bhattacharyya coefficient is applied to evaluate the similarity between the current observation $K(x_t)$ and the reference model $$K^* = \{k^*(n; x_0)\}_{n=1,\ldots,N}, d[K^*, K(x_t)]$$
$$= (1 - \rho[K^*, K(x_t)])^{1/2} \rho[K^*, K(x_t)]$$
$$= \sum_{n=0}^{N-1} \sqrt{k^*(n; x_0) k(n; x_t)}.$$

Further, in order to encode the spatial information of the observation, a multi-part color model is adopted, which splits an object vertically into two parts. Thus, the local likelihood of the target I is defined as:

$$p(y_t^i | x_t^i) \propto \exp\left(\sum_{j=1}^{2} -\lambda d^2 [K_j^*, K_j(x_t^i)]\right).$$

Figure 9:
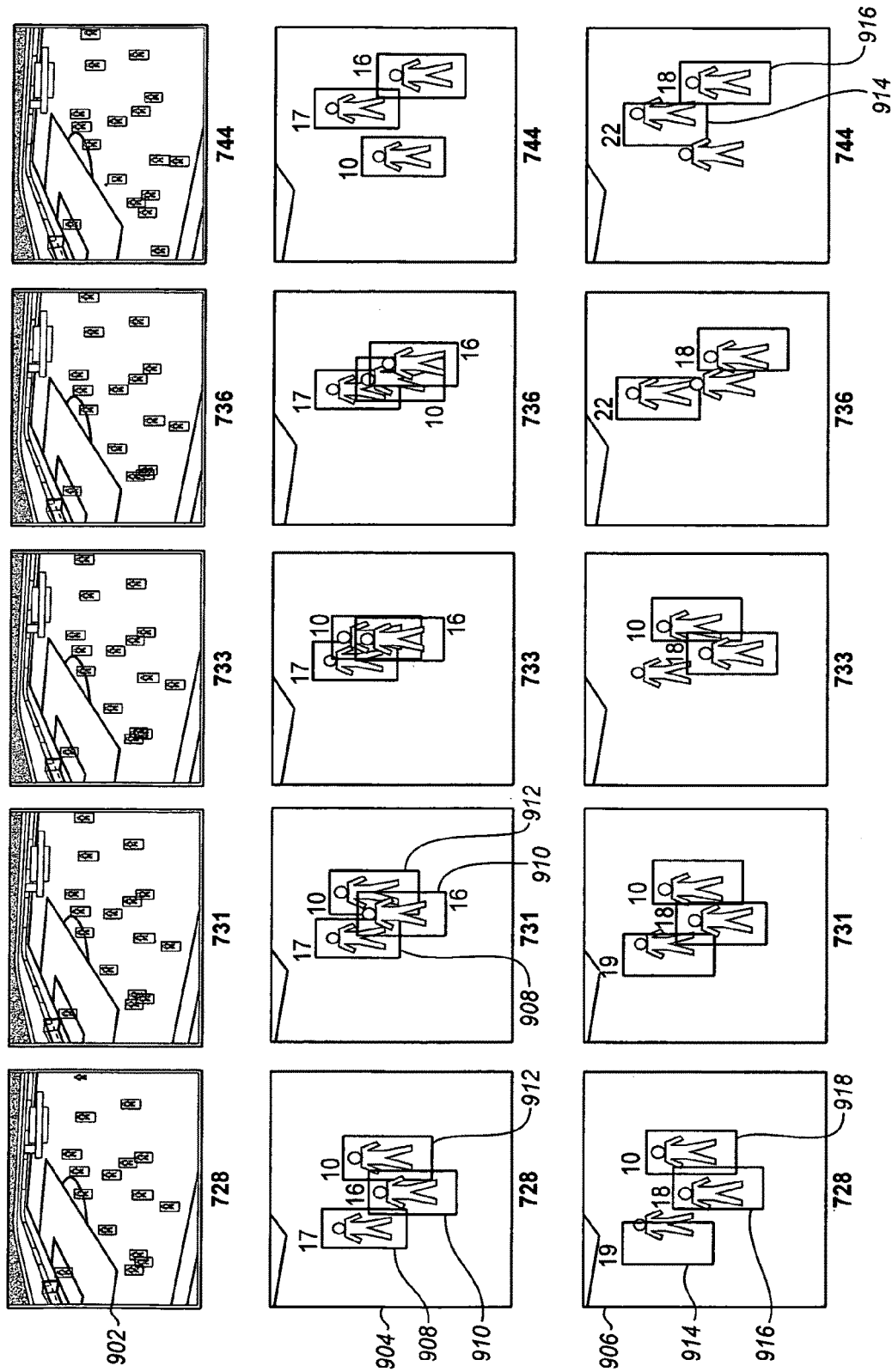
FIG. 9 illustrates an embodiment of tracking results of an implementation of the embodiments of the present invention when the implementation is carried out on two video clips of resolution 720×576 and 960×544.

FIG. 9 illustrates an embodiment of tracking results of an implementation of the embodiments of the present invention when the implementation is carried out on two video clips of resolution 720×576 and 960×544. The illustrations of rows 902-906 particularly focuses on a new player entering the scene. In one embodiment, the player entering is quickly detected and tracked robustly even with relatively heavy occlusions. As illustrated, row 904 shows a close-up views of the elliptic region labeled in the first image of row 902. In one technique, the color of the surrounding box (e.g., tracker) 908-912 for each player may be unique if the player has no interaction with others. Otherwise, the color of the trackers may be changed to black. The correct identities are maintained during occlusions, which is a benefit from the proposed weight adjusting scheme for the particles through the interactive likelihood. Row 904 illustrates the trackers being merged together when they get close (such as going from three trackers 914-918 to two trackers 914-916 and so on). Further, a new track may be created if a single tracker is split into two trackers so that the label of the same target may be different after occlusions.

Figure 10:
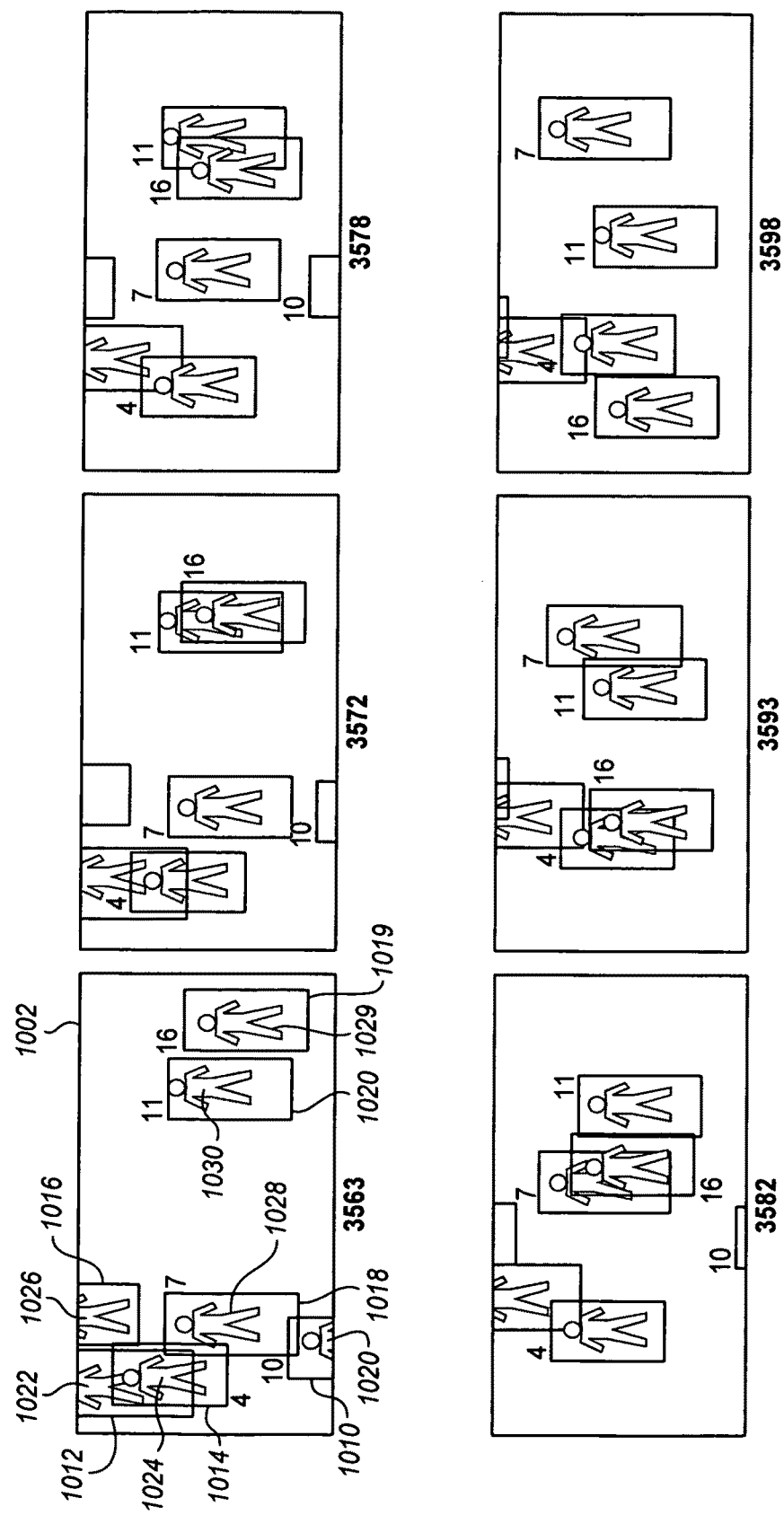
FIG. 10 illustrates another embodiment of tracking results of an implementation of the embodiments of the present invention.
Figure 10:
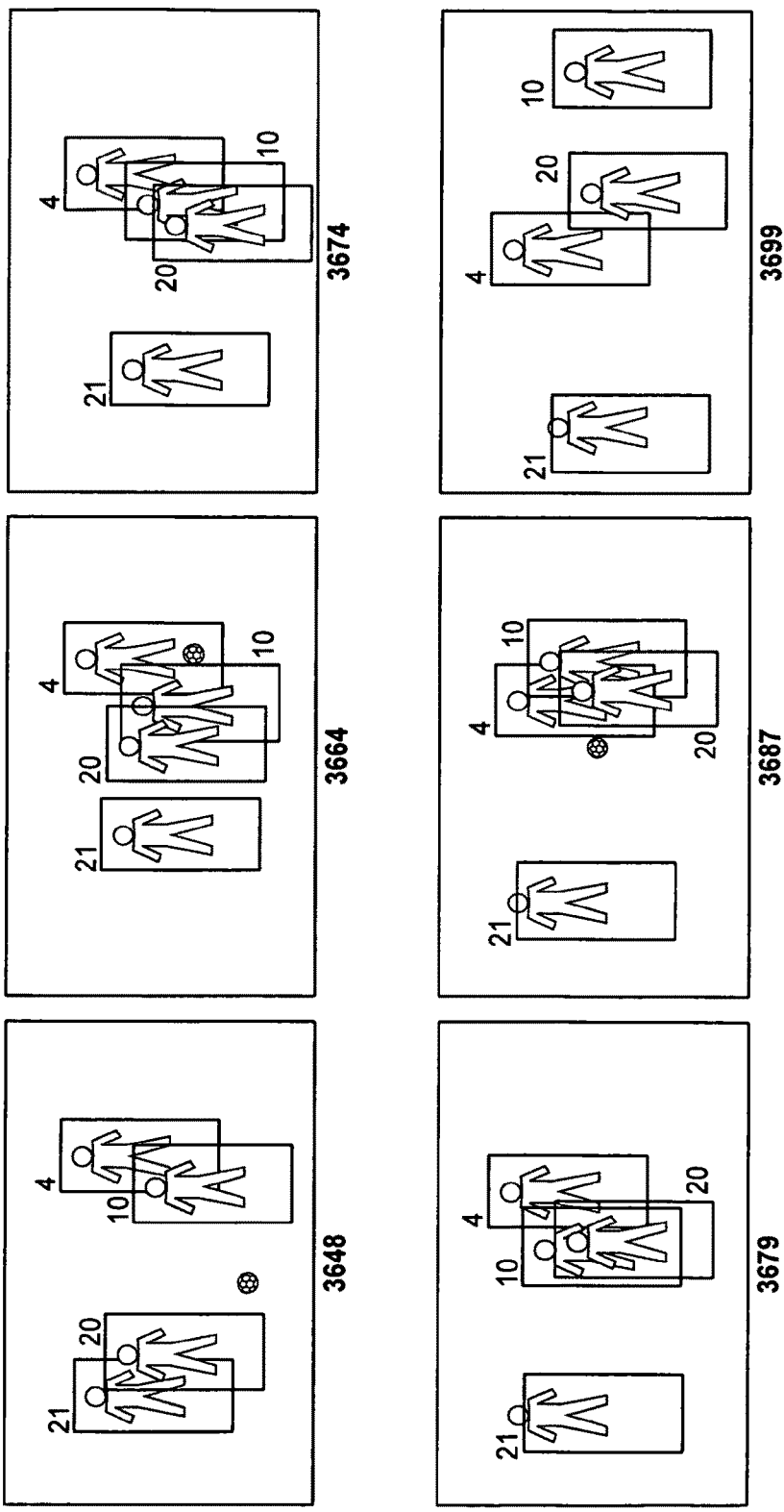

FIG. 10 illustrates another embodiment of tracking results of an implementation of the embodiments of the present invention. In embodiment, rows 1002-1008 illustrate tracking results of players. Each player 1010-1019 is individually tracked using a corresponding tracker 1020-1029 and, as shown, each player 1010-1019 is individually tracked and his identity is correctly maintained regardless of any partial or complete occlusions.

FIG. 11 illustrates an embodiment of a computing system 1100 having embodiments of the present invention implemented as a hybrid of software and hardware components. Certain functionalities of the embodiments are implemented in hardware, and certain other functionalities are implemented in software. As illustrated, a CPU chip 1102 is designed to work with a video coprocessor 1110. The video coprocessor 1110 may be part of a video device (e.g., video camera) having other processing units, such as a graphics processing unit (GPU)). In one embodiment, the video coprocessor 1110 employs any number of novel software logic and hardware logic 1100 to work with other conventional software and hardware logic to perform the embodiments of the present invention in concert with any conventional operations.

A random access memory (RAM) 1106 comprises application database having object information. A memory controller 1104 accesses data in RAM 1106 and forwards to a CPU 1102 and/or video coprocessor 1110 for processing. RAM 1106 may include double data rate RAM (DDR RAM), extended data output RAM (EDO RAM) etc. Any data (e.g., video images or other input data to be processed) may be stored at memory 1108 and later, any resulting data (e.g., final video images and any relevant information) 1212 are then transferred to a display device 1112. Alternatively, a video controller may be on the same die as the CPU 1102 and sharing the cache and memory controller may be used. Display 1112 may be of various types, such as Cathode Ray Tube (CRT), Thin Film Transistor (TFT), Liquid Crystal Display (LCD), DPL, etc.

In one embodiment, some processes of the graphics pipeline as described above are implemented in software, while the rest are implemented in hardware. Memory 208 may comprise a pre-allocated region of a buffer; however, it should be understood by one of ordinary skill in the art that the invention is not so limited, and that any memory accessible to the lower graphics pipeline may be used. Computer system 1100 may further includes an input/output (I/O) control hub (ICH), one or more I/O devices, etc.

CPU 1102 may include one or more processors to execute instructions in order to perform whatever software routines the computing system implements. The instructions frequently involve some sort of operation performed upon data. Both data and instructions are stored in system memory 1108 and any associated cache. Cache is typically designed to have shorter latency times than system memory 1108; for example, cache might be integrated onto the same silicon chip(s) as the processor(s) and/or constructed with faster static RAM (SRAM) cells whilst the system memory 1108 might be constructed with slower dynamic RAM (DRAM) cells. By tending to store more frequently used instructions and data in the cache as opposed to the system memory 1108, the overall performance efficiency of the computing system 1100 improves.

System memory 1108 is deliberately made available to other components within the computing system 1100. For example, the data (e.g., input graphics data) received from various interfaces to the computing system 1100 (e.g., keyboard and mouse, printer port, Local Area Network (LAN) port, modem port, etc.) or retrieved from an internal storage element of the computer system 1100 (e.g., hard disk drive) are often temporarily queued into system memory 1108 prior to their being operated upon by the one or more processor(s) in the implementation of a software program. Similarly, data that a software program determines should be sent from the computing system 1100 to an outside entity through one of the computing system interfaces, or stored into an internal storage element, is often temporarily queued in system memory 1108 prior to its being transmitted or stored.

An ICH may used for ensuring that such data is properly passed between the system memory 1108 and its appropriate corresponding computing system interface (and internal storage device if the computing system is so designed) and may have bi-directional point-to-point links between itself and the observed I/O devices. Memory controller 1104 may be used for managing the various contending requests for system memory 1108 accesses amongst the CPU 1102, interfaces and internal storage elements that may proximately arise in time with respect to one another.

One or more I/O devices are also implemented for transferring data to and/or from the computing system 1100 (e.g., a networking adapter); or, for large scale non-volatile storage within the computing system 1100 (e.g., hard disk drive).

Portions of various embodiments of the present invention may be provided as a computer program product, which may include a computer-readable medium having stored thereon computer program instructions, which may be used to program a computer (or other electronic devices) to perform a process according to the embodiments of the present invention. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

In the foregoing specification, the invention has been described with reference to specific exemplary embodiments thereof. It will, however, be evident that various modifications and changes may be made thereto without departing from the broader spirit and scope of the invention as set forth in the appended claims. The Specification and drawings are, accordingly, to be regarded in an illustrative rather than a restrictive sense.

We claim:

1. A method comprising:
   processing an input video image, wherein processing including extracting key points relating to the video image;
   detecting whether enough key points relating to the video image were extracted, wherein the detecting includes searching for optimal mapping, wherein the searching includes calculating a matching error by using a distance map generated by a distance transform, and further includes one of (i) matching of angles of detected lines or a field position, (ii) a size of a field model, and (iii) comparing a camera parameter to a predetermined range;
   performing direct estimation of the video image if enough key points have been extracted; and
   generating a homograph matrix of a final video image based on the direct estimation.

2. The method of claim 1, wherein the direct estimation comprises generating mapping hypothesis by detecting and evaluating the key points relating to least two horizontal lines crossing at least two vertical points, wherein the key points include real intersection points.

3. The method of claim 2, wherein the key points further comprise virtual intersection points including an intersection of one real line and one extended real line or an intersection of two extended real lines in the field model, wherein the field model includes a background or field of a video image.

4. The method of claim 1, further comprising performing an indirect estimation of the video image if enough key points have not been extracted, wherein the indirect estimation includes at least one of feature point detecting, point matching between two successive images, point pair filtering via random sample consensus (RANSAC), and global motion calculating with a least square estimation, wherein point pair filtering includes filtering out data outliers including false matches, wherein the RANSAC include an algorithm for fitting of field models while filtering out one or more of the data outliers.

5. The method of claim 1, further comprising pre-processing the video image, wherein pre-processing includes performing view-type classification of the video image.

6. The method of claim 1, further comprising displaying the final video image on a display device.

7. A system having a storage medium and a processor coupled with the storage medium, the processor to:
   process an input video image, wherein processing including extracting key points relating to the video image;
   detect whether enough key points relating to the video image were extracted, wherein the detecting includes searching for optimal mapping, wherein the searching includes calculating a matching error by using a distance map generated by a distance transform, and further includes one of (i) matching of angles of detected lines or a field position, (ii) a size of a field model, and (iii) comparing a camera parameter to a predetermined range;
   perform direct estimation of the video image if enough key points have been extracted; and
   generate a homograph matrix of a final video image based on the direct estimation.

8. The system of claim 7, wherein the direct estimation comprises generating mapping hypothesis by detecting and evaluating the key points relating to least two horizontal lines crossing at least two vertical points, wherein the key points include real intersection points.

9. The system of claim 8, wherein the key points further comprise virtual intersection points including an intersection of one real line and one extended real line or an intersection of two extended real lines in the field model, wherein the field model includes a background or field of a video image.

10. The system of claim 7, wherein the processor is further to perform an indirect estimation of the video image if enough key points have not been extracted, wherein the indirect estimation includes at least one of feature point detecting, point matching between two successive images, point pair filtering via random sample consensus (RANSAC), and global motion calculating with a least square estimation, wherein point pair filtering includes filtering out data outliers including false matches, wherein the RANSAC include an algorithm for fitting of field models while filtering out one or more of the data outliers.

11. The system of claim 7, wherein the processor is further to pre-process the video image, wherein pre-processing includes performing view-type classification of the video image, and wherein the processor is further to display the final video image on a display device.

12. A non-transitory machine-readable medium comprising instructions which, when executed, cause a machine to:
   process an input video image, wherein processing including extracting key points relating to the video image;
   detect whether enough key points relating to the video image were extracted, wherein the detecting includes searching for optimal mapping, wherein the searching includes calculating a matching error by using a distance map generated by a distance transform, and further includes one of (i) matching of angles of detected lines or a field position, (ii) a size of a field model, and (iii) comparing a camera parameter to a predetermined range;
   perform direct estimation of the video image if enough key points have been extracted; and generate a homograph matrix of a final video image based on the direct estimation.

13. The non-transitory machine-readable medium of claim 12, wherein the direct estimation comprises generating mapping hypothesis by detecting and evaluating the key points relating to least two horizontal lines crossing at least two vertical points, wherein the key points include real intersection points.

14. The non-transitory machine-readable medium of claim 13, wherein the key points further comprise virtual intersection points including an intersection of one real line and one extended real line or an intersection of two extended real lines in the field model, wherein the field model includes a background or field of a video image.

15. The non-transitory machine-readable medium of claim 12, wherein the instructions which, when executed, further cause the machine to perform an indirect estimation of the video image if enough key points have not been extracted, wherein the indirect estimation includes at least one of feature point detecting, point matching between two successive images, point pair filtering via random sample consensus (RANSAC), and global motion calculating with a least square estimation, wherein point pair filtering includes filtering out data outliers including false matches, wherein the RANSAC include an algorithm for fitting of field models while filtering out one or more of the data outliers.

16. The non-transitory machine-readable medium of claim 12, wherein the instructions which, when executed, further cause the machine to pre-process the video image, wherein pre-processing includes performing view-type classification of the video image, and wherein the processor is further to display the final video image on a display device.

* * * * *

UNITED STATES PATENT AND TRADEMARK OFFICE
CERTIFICATE OF CORRECTION

PATENT NO. : 8,553,982 B2  
APPLICATION NO. : 12/646807  
DATED : October 8, 2013  
INVENTOR(S) : Tong et al.

Page 1 of 1

It is certified that error appears in the above-identified patent and that said Letters Patent is hereby corrected as shown below:

In the Specification

In column 7, at line 35 delete, " $p\left(x_{0:t}^i \mid y_{1:t}^i, y_{1:t}^{J_{1:t}}\right) = p\left(x_{0:t}^i \mid y_{1:z}^i\right)$ " and insert -- $p\left(x_{0:t}^i \mid y_{1:t}^i, y_{1:t}^{J_{1:t}}\right) = p\left(x_{0:t}^i \mid y_{1:t}^i\right)$ --.

In column 7, at line 41 delete, " $\left(x_{0:t-1}^i \mid y_{1:t-1}^i, y_{1:t-1}^{J_{1:t-1}}\right) p\left(y_t^{J_t} \mid x_t^i, y_t^i\right)$ " and insert -- $\left(x_{0:t-1}^i \mid y_{1:t-1}^i, y_{1:t-1}^{J_{1:t-1}}\right) p\left(y_t^{J_t} \mid x_t^i, y_t^i\right)$ --.

Signed and Sealed this  
Fifteenth Day of April, 2014

Michelle K. Lee  
*Deputy Director of the United States Patent and Trademark Office*